United States Patent
Newcombe et al.

(10) Patent No.: US 6,947,925 B2
(45) Date of Patent: Sep. 20, 2005

(54) SYSTEM AND METHOD FOR PERFORMING LOOKUPS ACROSS NAMESPACE DOMAINS USING UNIVERSAL RESOURCE LOCATORS

(75) Inventors: Russell L. Newcombe, Round Rock, TX (US); Christopher P. Vignola, Port Jervia, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 10/122,542

(22) Filed: Apr. 15, 2002

(65) Prior Publication Data

US 2003/0195870 A1 Oct. 16, 2003

(51) Int. Cl.[7] .............................................. G06F 17/30
(52) U.S. Cl. ..................... 707/3; 707/101; 709/204; 709/223; 715/501.1; 715/513
(58) Field of Search ............................... 707/2, 3, 101, 707/204, 9, 10, 100; 709/223, 218, 204, 225, 201; 715/501.1, 513, 514

(56) References Cited

U.S. PATENT DOCUMENTS

| | | | |
|---|---|---|---|
| 5,377,323 A | | 12/1994 | Vasudevan .................. 395/200 |
| 5,745,683 A | | 4/1998 | Lee et al. ................. 395/200.8 |
| 5,890,171 A | * | 3/1999 | Blumer et al. ........... 715/501.1 |
| 6,061,695 A | * | 5/2000 | Slivka et al. ............... 715/513 |
| 6,061,743 A | | 5/2000 | Thatcher et al. ............ 709/302 |
| 6,167,427 A | * | 12/2000 | Rabinovich et al. ........ 709/201 |
| 6,175,863 B1 | * | 1/2001 | Belfiore et al. ............. 709/218 |
| 6,442,590 B1 | * | 8/2002 | Inala et al. .................. 709/204 |
| 6,571,285 B1 | * | 5/2003 | Groath et al. ............... 709/223 |
| 6,625,604 B2 | * | 9/2003 | Muntz et al. ................... 707/9 |
| 6,675,355 B1 | * | 1/2004 | Demopoulos et al. ...... 715/513 |
| 6,778,979 B2 | * | 8/2004 | Grefenstette et al. .......... 707/3 |
| 6,820,075 B2 | * | 11/2004 | Shanahan et al. .............. 707/3 |
| 2002/0143944 A1 | * | 10/2002 | Traversat et al. ........... 709/225 |
| 2002/0152299 A1 | * | 10/2002 | Traversat et al. ........... 709/223 |

OTHER PUBLICATIONS

"Federation Name Resolution" MIRLab, pp. 1–5, Sep. 28, 2001.
"The Java Naming and Directory Interface JNDI", pp. 1–7, Sep. 28, 2001.
"How to Java: JNDI overview, Part 1: An introduction to naming services", Todd Sundsted, pp. 1–6, Jan. 2000, JavaWorld, San Francisco, CA.
"JNDI overview Part 2: An introduction to directory services", Todd Sundsted, pp. 1–7, Jan. 2000, JavaWorld, San Francisco, CA.
"JNDI overview, Part 3 Advanced JNDI", pp. 1–6, Jan. 2000, JavaWorld, San Francisco, CA.
"JNDI overview, Part 4: the Doc–u–Matic, a JNDI application", Todd Sundsted, pp. 1–12, Jan 2000, JavaWorld, San Francisco, CA.

* cited by examiner

Primary Examiner—Shahid Al Alam
(74) Attorney, Agent, or Firm—Lily Neff; Cantor Colburn LLP

(57) ABSTRACT

A system and method for performing a lookup in a second namespace, the lookup being performed from a first namespace, whereby a component performing the lookup is not required to be configured for performing a lookup in the second namespace, the system and method further comprising: parsing a first lookup request for a URL tag, the first lookup request for an object located in the second namespace, the lookup request including a symbolic name corresponding to a target location in the second namespace, the URL tag corresponding to a URL context; searching the URL context for a provider URL corresponding to the symbolic name; and creating a second lookup request, the second lookup comprising the provider URL and the object's name.

9 Claims, 4 Drawing Sheets

SYSTEM AND METHOD FOR PERFORMING LOOKUPS ACROSS NAMESPACE DOMAINS USING UNIVERSAL RESOURCE LOCATORS

BACKGROUND

Naming services and directory services provide a way of identifying and associating names with data. Similarly, naming and directory services may also be used for referencing data and data locations using more easily comprehensible names. For example, NIS and NIS+ are naming services developed by Sun Microsystems for allowing users to access files and applications on any NIS host using a single login name and password. DNS, an Internet naming service, associates people-friendly names with computer network addresses. Additional naming and/or directory services include LDAP (Lightweight Directory Access Protocol), NDS (Novell Directory Services), and COS (Common Object Services). While normally having similar basic functionality, each naming or directory service may specify its own protocols, syntax, nomenclature, naming conventions, etc. When a naming service is implemented in accordance with such specifications, the implementation is often referred to as a namespace. For example, a person using a web browser on a personal computer to access a web page via a friendly DNS name (i.e. www.widgetcompany.com), is considered to be utilizing the DNS namespace.

Application programming interfaces ("APIs") such as the Java Naming and Directory Interface ("JNDI") provide an interface for communication between namespaces. For example, where namespace A and namespace B have been implemented in accordance with JNDI, a request for data from namespace B by a host in namespace A may be satisfied without requiring the host to be configured as a node of namespace B. Likewise, a request for data from namespace A by a host in namespace B may be satisfied without requiring the host to be configured as a node of namespace A. However, inter-namespace data exchange APIs such as JNDI require that a request for data from a foreign namespace by a host in a local namespace include specific location/naming information. Solutions have been offered that require special mechanisms within a naming service itself to create, recognize, and traverse federated junctions between namespaces, however such solutions require participation by the naming service and are therefore limited to naming services that implement identical federation schemes.

SUMMARY OF THE INVENTION

A system and method for performing a lookup in a second namespace, the lookup being performed from a first namespace, whereby a component performing the lookup is not required to be configured for performing a lookup in the second namespace, the system and method further comprising: parsing a first lookup request for a URL tag, the first lookup request for an object located in the second namespace, the lookup request including a symbolic name corresponding to a target location in the second namespace, the URL tag corresponding to a URL context; searching the URL context for a provider URL corresponding to the symbolic name; and creating a second lookup request, the second lookup comprising the provider URL and the object's name.

DETAILED EMBODIMENT

Figure 1:
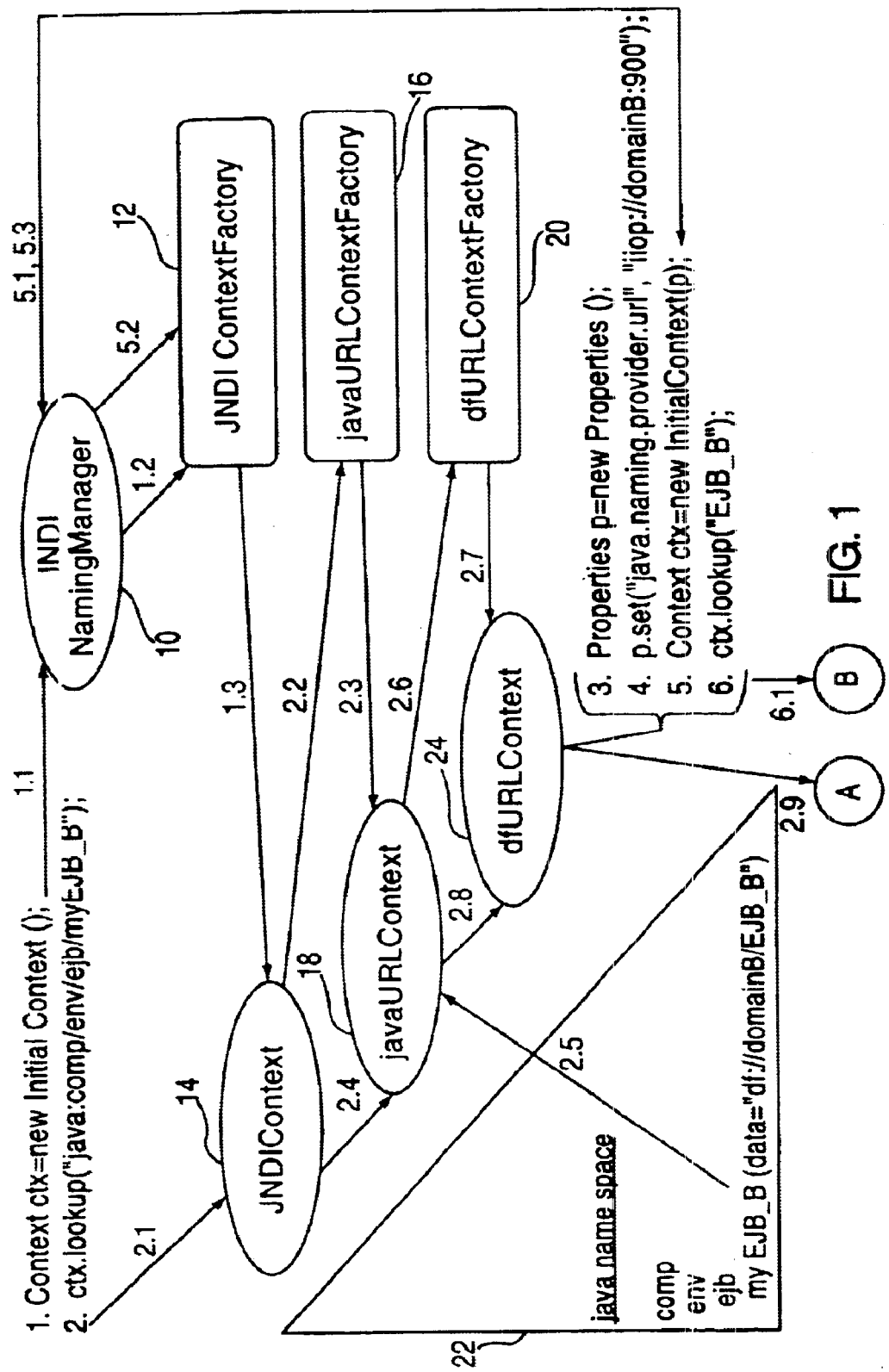
FIG. 1 shows the flow of an exemplary lookup request across namespaces.

In an exemplary embodiment, the invention is used in conjunction with naming services that support namespace lookups via universal resource locators (URLs) and that include a mechanism for delegating namespace requests to a third party provider. For purposes of explanation and example, the embodiments of the invention are described in conjunction with the JNDI SPI/API to satisfy these requirements. It is understood that the invention may be implemented in conjunction with any namespace API/SPI or similar mechanism known to one of ordinary skill in the art without exceeding the scope of this disclosure. While JNDI itself describes the use of URLs in lookup names, this usage incorporates explicit network location information in the URL itself. An embodiment of the invention uses only symbolic names in a federation URL that is mapped locally within the local namespace to the actual network location information, to achieve namespace federation. This provides for the insulation of applications from namespace reconfiguration and changes to topography by prescribing a method to map the application's lookup name to the actual lookup name. Moreover, an embodiment of the invention advantageously allows programming model neutrality by prescribing a method to map the facilities of a particular naming system to the underlying naming interface (JNDI, for example) without requiring an additional API set that is separate and distinct from the underlying naming interface API set. This provides for federation without the need for disparate namespaces to explicitly participate in a federation scheme.

JNDI provides a NamingManager that manages naming context creation. Naming contexts are the programming implements used to perform namespace operations, such as lookup and bind. Actual naming contexts are produced by context factories, which are registered with the NamingManager. As prescribed by JNDI, there are both regular and URL (universal resource locator) contexts and context factories. The JNDI NamingManager, using a context factory registered specifically for the purpose of creating regular naming contexts, creates regular naming contexts. Instantiating a new InitialContext object creates a regular naming context in the Java programming language. All JNDI contexts must support URL composite name syntax. This syntax is of the form:

URL_TAG:<location-information>/<JNDI-name>

"URL_TAG" identifies the type of URL context and "location-information" identifies the namespace location of the object (i.e. "JNDI-name") bound in the namespace. A JNDI context is required to process a URL composite name by stripping off the "URL_TAG" from the composite name and then requesting a new naming context from the JNDI directory manager that supports the specified "URL_TAG". The returned naming context is known as a "URL naming context". The naming context request in process must be forwarded to the newly created URL naming context.

The JNDI NamingManager, using a URL context factory registered specifically for a particular "URL_TAG", creates URL naming contexts that correspond to a specified "URL_

TAG". This is accomplished through an interaction between a naming context and the JNDI NamingManager, as described in the preceding paragraph.

The J2EE architecture defines a particular URL context factory and context that use the URL_TAG name of "java". The java namespace is defined as a local, in-memory name space for use by a J2EE component. Names in this namespace are unique with respect to a particular component: each of two components can independently use the same unique name within their java namespace; each component's use of the name need not correspond to the same namespace binding.

The J2EE architecture specifies that components use local, composite lookup names of the form:

java:comp/env/<JNDI name>

The J2EE architecture specifically requires an administrative action during component deployment to map the component's local lookup name to an actual lookup name. This mapping information is specific to the environment in which the component is deployed. Furthermore, this mapping information is retained as part of the component's configuration data. When a J2EE server loads a component, this configuration information is used to construct the local, in-memory java namespace.

An embodiment of the invention introduces a specific URL context factory and context for use in achieving namespace federation. In the preferred embodiment, the chosen URL_TAG is "df". Each namespace to be bound together in a federation has a name context bound to the namespace root context by the name "df". Within the "df" naming context are bound linkages to other namespaces. Each such binding contains the necessary "provider url" information necessary to establish a regular naming context into another namespace. The java property 'java.naming-.provider.url" is the architectured mechanism by which one identifies to the JNDI NamingManager the location of the target namespace, when creating a regular naming context. For use by applications following the J2EE architecture, provider URLs are typically for the iiop protocol, and take either the form "corbaloc:iiop:ip-name:port" or the form "iiop://ip-name:port" which identifies the iiop (CORBA) protocol for connecting to the namespace located at the Internet address and port number referred to by ip-name:port.

Figure 2:
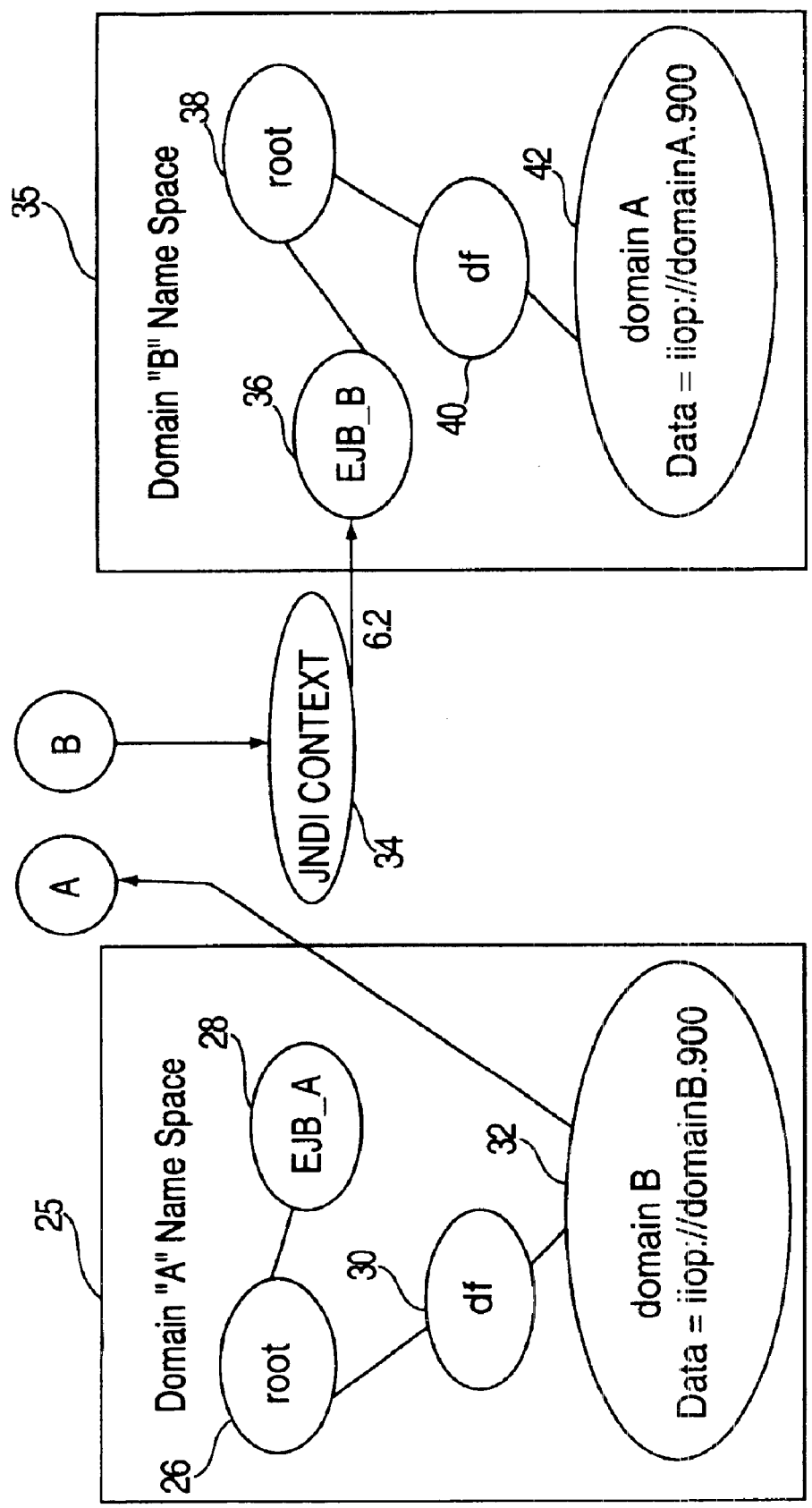
FIG. 2 is a continuation of FIG. 1 and shows the flow of an exemplary lookup request across namespaces.

FIGS. 1 and 2 collectively describe the flow of an exemplary JNDI Lookup across domains. Lookups are implemented using a URL syntax that designates a component namespace (i.e. Java:) to be performed. The component namespace reference is configured using a URL that designates a federated lookup and the local namespace includes URL information referencing the target namespace. Referring now to FIGS. 1 and 2. A component (not shown) in domain A requests (1.1) a new initial context from the JNDI Naming manager 10. The JNDI NamingManager 10 drives (1.2) a registered JNDI context factory 12 to create (1.3) a regular naming context 14. The regular naming context 14 is returned to the component. The component issues (2.1) a lookup request for "java:comp/env/ejb/myEJB_B" to the regular naming context 14. The regular naming context 14 parses off URL TAG "java:" and drives (2.2) the javaURL-ContextFactory 16. In general however, the regular naming context does not drive the javaURLContextFactory directly, but rather goes through the JNDI NamingManager 10 to select the URL context factory that corresponds to the specified URL_TAG:. The javaURLContextFactory 16 creates and returns (2.3) a javaURLContext 18. The regular naming context 14 forwards (2.4) the lookup request to the javaURLContext 18.

The javaURLContext 18 locates and reads (2.5) "comp/env/ejb/myEJB_B" from the java namespace 22 belonging to current component. The returned data is another JNDI lookup name "df://domainB/EJB_B", which the javaURL-Context 18 uses recursively to continue the lookup.

The javaURLContext 18 (as with all contexts) parses off URL TAG "df:" and drives (2.6) the dfURLContextFactory 20 to create a corresponding URL context. As stated previously, a naming context does not drive a URLContextFactory directly, but rather goes through the JNDI Naming-Manager 10 to select the URLContextFactory that corresponds to the specified URL_TAG:. The dfURLContextFactory 20 creates and returns (2.7) a dfURL-Context 24.

The javaURLContext 18 forwards (2.8) the lookup request to the dfURLContext 24. The dfURLContext locates and reads (2.9) the entry "df/domainB" 32 from domain A's name space 25. The returned data 32 is a provider URL to the target domain's namespace 35, which is used to create a regular context for that namespace.

The dfURLContext 24 creates a Java Properties object (as per JNDI specification) to configure a new InitialContext. The dfURLContext 24 sets the provider URL value for this new InitialContext using the provider URL for domain B 35, which was configured in the namespace of Domain A 25. The dfURLContext 24 creates an initial context by issuing a request for a new initial context to the JNDI NamingManager 10. The JNDI NamingManager 10 drives the registered JNDI context factory to create the new context and the regular naming context 34 for the domain B namespace returned. The dfURLContext 24 strips the JNDI lookup name from the URL composite name following the <location-information> portion of the name yielding the lookup name "EJB_B". The dfURLContext 24 forwards (6.1) the lookup request to the domain B regular JNDI context 34. The regular JNDI context (for domain B) 34 performs a lookup (6.2) in domain B's namespace 35 and returns the lookup result.

Figure 3:
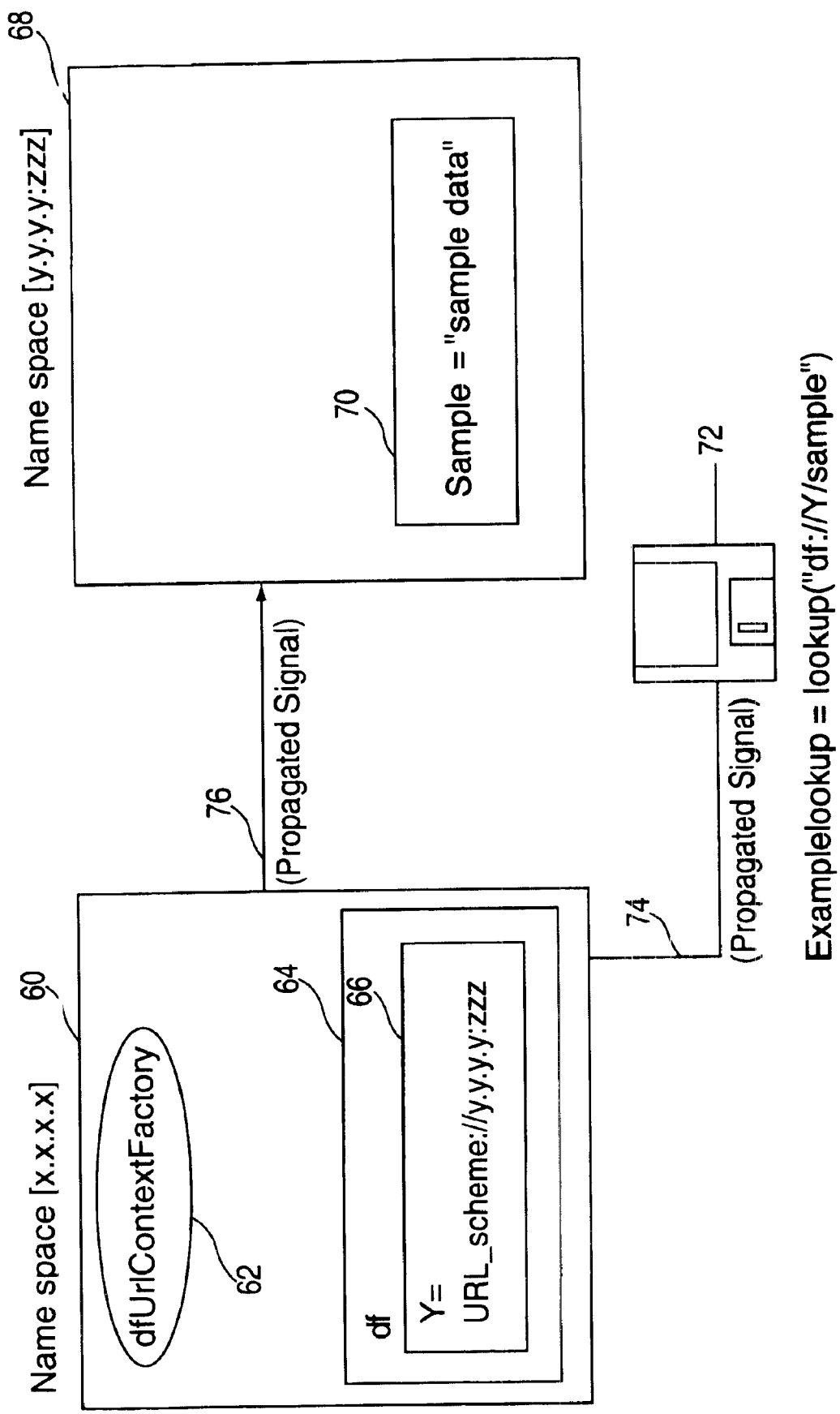
FIG. 3 shows an exemplary system for performing a lookup request across namespaces.

FIG. 3 shows an exemplary system for implementing a lookup request across namespaces. Namespace X at 60 is located at x.x.x.x and includes URL context factory df at 62, where df includes references to a logical set of namespaces to be federated. The URL context factory 62 creates context df 64 which includes entry 66 for targeting namespace Y 68 at location y.y.y.y. The entry 66 comprises the following:

Y=URL_scheme://y.y.y.y:zzz.

It is understood that URL_scheme://y.y.y.y:zzz is an exemplary scheme and location and that a scheme and location may comprise any scheme and location type known to one of ordinary skill in the art including a DNS scheme/IP location having a form similar to 192.168.0.1:88. For example, namespace Y 68 includes a reference 70 to the object "sample data". Namespace X 60 and namespace Y 68 each comprise at least one computer or other data device as is known to one of ordinary skill in the art. In addition, namespace X 60 and namespace Y 68 communicate using any method of data communication known to one of ordinary skill in the art including propagated signals 76 such as those generated by electronic data communications networks. Computer program code enabling namespace X 60 to perform a lookup in namespace Y 68 is located in a computer readable medium 72 and is received by namespace X 60 and/or namespace Y 68 via a propagated signal 74 or via any mechanism known to one of ordinary skill in the art.

Alternatively, the computer readable program code may be integrated into a component of namespace X 60 and/or namespace Y 68.

Namespace 60 contains entry Y 66, which contains a URL that identifies the location of namespace Y 68. The naming service for namespace 60 delegates namespace requests to a 3rd party provider 62. Namespace 68 contains the entry "sample" 70, which contains sample data. A client performs a lookup in local namespace 60 using the lookup name "df//Y/sample". The lookup request is passed to the 3rd party provider 62. The 3rd party provider 62 parses the lookup string into two parts: "df://Y" and "sample". The 3rd party provider 62 uses the first part ("df://Y") to lookup the URL 64, 66 that locates namespace 68. The 3rd party provider 62 then uses that URL 66 to direct a subsequent lookup request to namespace 68 and uses the remaining part of the original lookup name—"sample"—as the lookup name passed to namespace 68. The result of this lookup is passed to the client that performed the original lookup.

Figure 4:
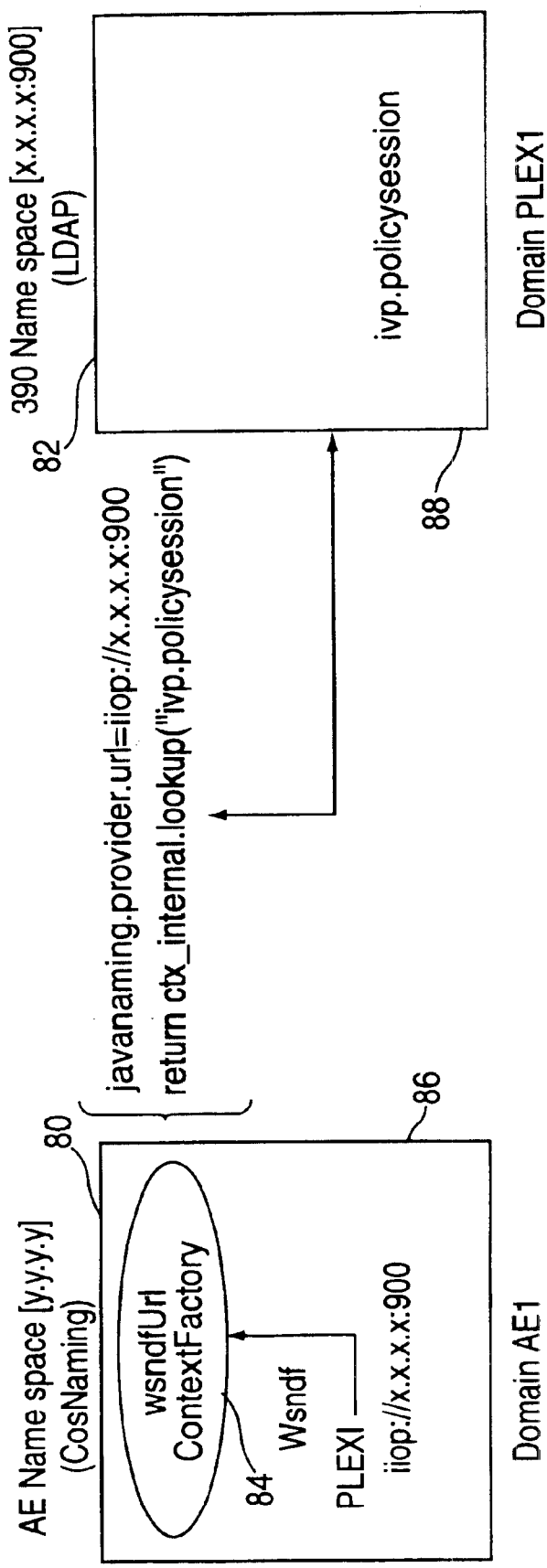
FIG. 4 shows an alternative exemplary system for performing a lookup request across namespaces.

FIG. 4 shows an alternative exemplary embodiment using a WEB server product such as IBM WEBSPHERE. A CosNaming service, associated with AE namespace 80, contains the entry wsndf/PLEX1 86 that contains the string "iiop://x.x.x.x:ppp". An LDAP naming service, associated with 390 namespace 82, contains a home reference 88 named "ivp.policysession". The AE namespace 80 includes an installed URL context factory 84 named wsndfURLContextFactory. A client (not shown) of the AE namespace 80 performs a lookup with name "wsndf://PLEX1/ivp.policysession". The AE JNDI service matches the URL scheme, "wsndf", with installed URL context factory 84 "wsndfURLContextFactory" and passes the lookup request to it. The wsndfURLContextFactory 84 breaks the lookup name into two parts: "wsndf/PLEX1" and "ivp.policysession". The wsndfURLContextFactory 84 uses "wsndf/PLEX1" to lookup the java.naming.provider.url 86 necessary to do a lookup in 390 namespace 82, then does a lookup in the 390 namespace 82 for the second part of the name—"ivp.policysession". The lookup result is returned to the client of the AE namespace 80.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A computer implemented method for performing lookup across namespace domains, comprising:

parsing a first lookup request for a URL tag, said first lookup request being performed from a first namespace, said first lookup request targeting an object located in a second namespace, said first lookup request including a symbolic name corresponding to a target location in said second namespace, said URL tag corresponding to a URL context;

searching said URL context for a provider URL corresponding to said symbolic name; and creating a second lookup request, said second lookup comprising said provider URL and said object name.

2. A method as in claim 1 wherein said first namespace and said second namespace are enabled for communication with each other.

3. A method as in claim 2 wherein said first namespace and said second namespace are disparate namespaces.

4. A method as in claim 2 wherein said first namespace and said second namespace are not configured as a federated domain.

5. A method as in claim 2 wherein said first namespace and said second namespace are enabled with JNDI for communication with each other.

6. A method as in claim 5 wherein said first namespace and said second namespace are disparate namespaces.

7. A method as in claim 5 wherein said first namespace and said second namespace are not configured as a federated domain.

8. A computer system for federating at least two namespaces, comprising:

at least two namespaces, said two namespaces being configured for communication with each other;

a regular naming context, said regular naming context being created by a regular naming context factory in response to said regular naming context factory receiving a lookup request from a component in a first of said two namespaces for an object in a second of said two namespaces, said regular naming context parsing said lookup request for a first URL tag, said first URL tag being indicative of said second namespace; and a URL naming context, said URL naming context being created by a URL naming context factory in response to said regular naming said lookup request and in response to a second URL tag being included in said lookup request, said URL naming context parsing said lookup request for a symbolic name indicative of a provider URL, said provider URL being indicative of a target location in said second namespace.

9. An article of manufacture for lookups across namespace domains, comprising:

a computer useable medium having computer readable program code embodied therein for performing a lookup in a second namespace, said lookup being performed from a first namespace, wherein said first and second namespaces are disparate namespaces, comprising:

computer readable program code for parsing a first lookup request for a URL tag, said lookup request for an object located in said second namespace, said lookup request including a symbolic name corresponding to a target location in said second namespace, said URL tag corresponding to a URL context;

computer readable program code for searching said URL context for a provider URL corresponding to said symbolic name; and computer readable program code for creating a second lookup request, said second lookup comprising said provider URL and said object name.

* * * * *